E. W. HOOKER.
MACHINE FOR TREATING WEEVILED CEREALS.
APPLICATION FILED OCT. 10, 1911.
1,036,242.
Patented Aug. 20, 1912.
2 SHEETS—SHEET 2.
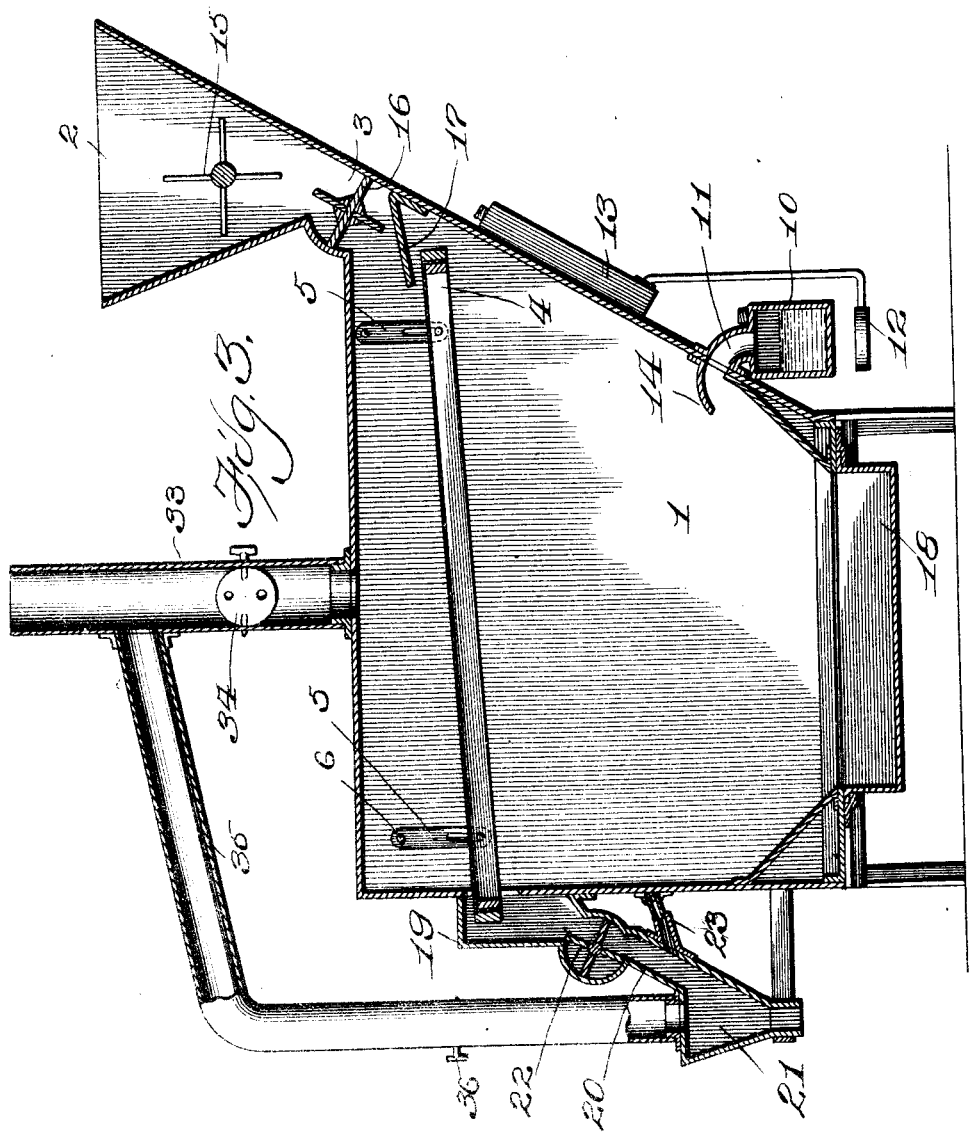

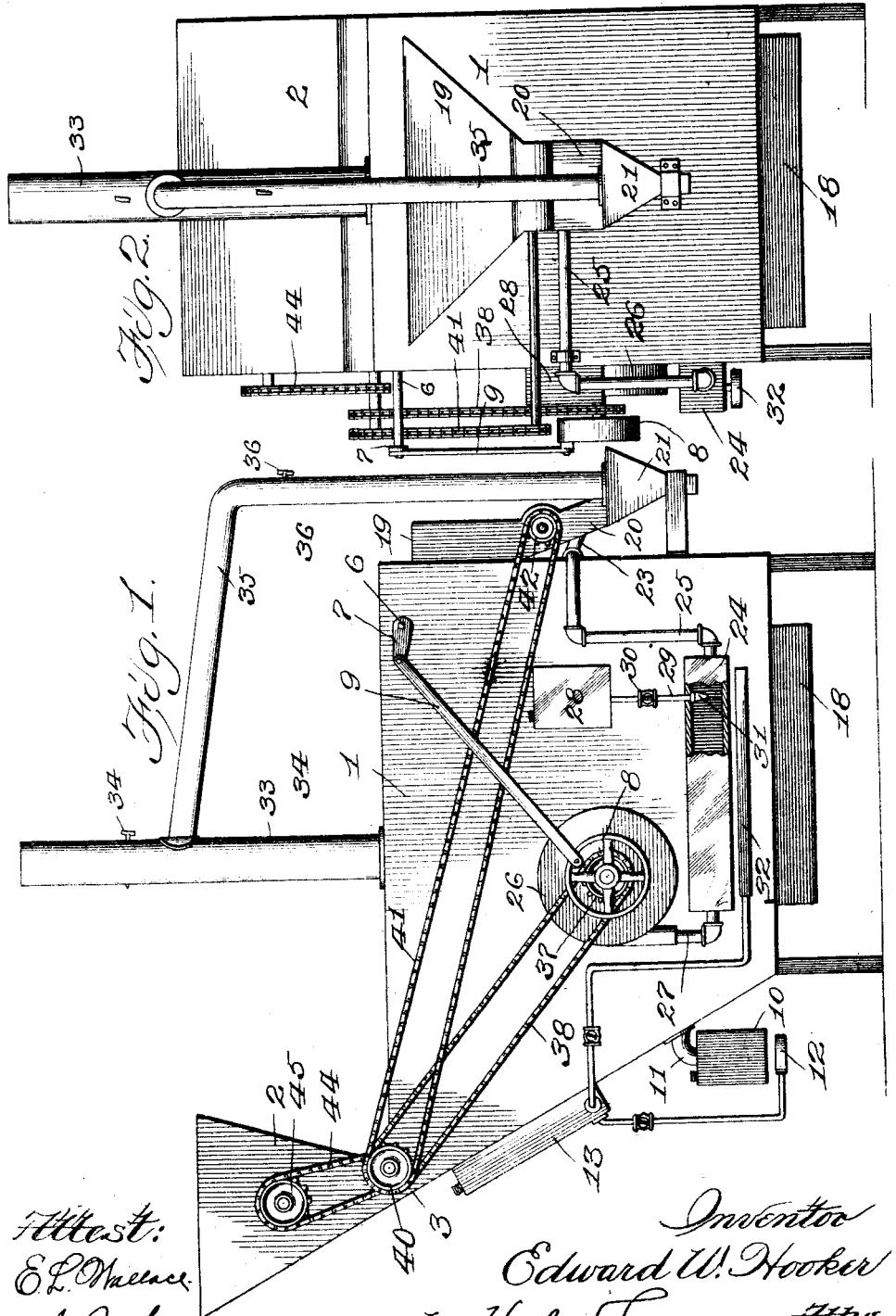

UNITED STATES PATENT OFFICE.

EDWARD W. HOOKER, OF ST. LOUIS, MISSOURI, ASSIGNOR OF ONE-HALF TO RICHARD H. KASTOR, OF ST. LOUIS, MISSOURI.

MACHINE FOR TREATING WEEVILED CEREALS.

1,036,242. Specification of Letters Patent. Patented Aug. 20, 1912.

Application filed October 10, 1911. Serial No. 653,938.

*To all whom it may concern:*

Be it known that I, EDWARD W. HOOKER, a citizen of the United States, and resident of St. Louis, Missouri, have invented certain new and useful Improvements in Machines for Treating Weeviled Cereals, of which the following is a specification containing a full, clear, and exact description, reference being had to the accompanying drawings, forming a part hereof.

My invention relates to improvements in machines for treating weeviled cereals, and the object of my invention is to construct a simple and inexpensive machine which will convey cereal or other matter which is weevil-infested through a vapor laden with formaldehyde or other weevil, egg and larvæ destroying agent, and thence through a bath of heated air, commingled with a vapor laden with ammonia or other agent for dissipating the formaldehyde carried by the cereal after passing through the vapor laden with formaldehyde.

In an application filed by me on October 10, 1911, and serially numbered 653,939 I illustrate and claim the process for treating the weeviled grain.

With the above purposes in view my invention consists in certain novel features of construction and arrangement of parts as will be hereinafter more fully described, pointed out in the claims and illustrated by the accompanying drawings, in which—

Figure 1 is an elevation, partly in section, illustrating a machine embodying my invention; Fig. 2 is a rear end elevation of the complete machine; and Fig. 3 is an enlarged, longitudinal, sectional elevation of the complete machine.

Referring by numerals to the accompanying drawings: 1 designates a chamber, the inclosing walls of which constitute the body portion of my machine.

2 designates a hopper which communicates with the interior of the chamber 1 through a passage way 3.

4 designates a screen consisting of a frame, preferably rectangular, covered with suitable reticulated material of comparatively fine mesh.

5 designates hangers which suspend the screen frame in the chamber 1. The hangers 5 are slotted so that the inclination of the screen 4 may be varied as required. The rear right hand hanger 5 is hung on a short shaft 6, which projects through the wall of the chamber 1, to the outer end of which is connected a crank 7.

8 designates a pulley to which a belt, not shown, is applied for the operation of all of the parts of the machine, and to which pulley a pitman 9 connects with the crank 7 for the reciprocation of the screen 4.

10 designates a container for formaldehyde which connects with the chamber 1 by a tubular connection 11.

12 designates a burner located beneath the container 10, and 13 designates a source of fuel supply for the burner.

14 designates a hood which projects into the chamber 1 over the outlet of the tubular connection 11 to prevent particles of dust or flour from the cereal from entering the container 10.

Located in the hopper 2 is an agitator 15 which prevents clogging of the cereal in the hopper. Located in the passage way 3 there are rotating blades 16 which serve the double function of acting as a valve to prevent the travel of the vapors from the chamber 1 upwardly through the hopper, and as a distributer for the cereal, the blades acting as a distributer discharge even amounts of grain to the shelf 17 which conveys the cereal from the passage way to the screen 4.

18 designates a removable drawer arranged to receive dust or flour from the cereal.

The rear end of the screen 4 projects through an opening formed in the rear wall of the chamber 1, and secured to the outer face of the rear wall of the chamber 1, around said opening, there is a hood 19 having a reduced neck 20 which connects the hood with the chamber 21. In the neck 20 there is a set of rotating blades 22 which act as a rotary cut-off to prevent communication between the chamber 21 and the chamber 1, so far as the passage of vapors is concerned but permit a downward travel of the cereal.

23 designates a comparatively wide-mouthed jet opening into the chamber 21.

24 designates a retort which consists of a hollow shell and is connected with the jet 23 by means of a pipe 25.

26 designates a fan casing in which there is an ordinary fan, not shown, and which casing connects with the retort 24 by means of a pipe 27.

28 designates a container for ammonia which is located above the retort 24 and is connected therewith by means of a pipe 29.

30 designates a valve for controlling the flow of ammonia, and 31 designates a jet secured to the pipe 29 and arranged to discharge into the retort 24.

Located beneath the retort 24 there is a burner 32 which receives its fuel supply from the source of fuel supply 13.

33 designates a stack leading from the chamber 1 to atmosphere to carry off the formaldehyde-laden vapors from the operating room. In order to control the draft for the purpose of confining the formaldehyde-laden vapors in the chamber 1 as great a length of time as possible, I have provided a damper 34.

35 designates a stack leading from the chamber 21 to atmosphere and preferably connects with the stack 33. This stack 35 is also provided with a damper 36.

Supported upon the same shaft which carries the pulley 8 there is a sprocket wheel 37 embraced by a sprocket chain 38 which chain embraces a sprocket wheel 39 which is carried by the shaft which supports the blades 16. Supported upon the same shaft is a sprocket wheel 40 which is embraced by a chain 41 leading to a sprocket wheel 42 carried by the shaft which supports the blades 22. The shaft which supports the blades 16 carries a third sprocket wheel 43 which is embraced by a chain 44 which connects with a sprocket wheel 45 carried by the shaft which supports the agitator 15.

In the practical operation of my machine, the hopper is filled with a quantity of material, such as rolled oats, which is to be treated for the destruction of grain weevil and their eggs and larvæ. The machine is then set in motion, which causes the agitator in the hopper to operate and the blades 16 to feed the screen 4 with the cereal to be treated. The screen 4 is reciprocated to cause the cereal to travel through the chamber 1, which chamber is filled with a vapor laden with formaldehyde arising from the container 10.

The screen discharges the cereal, after being treated in the formaldehyde vapor bath, into the chamber 21, where it is subjected to a current of air heated and impregnated with ammonia vapors, to dissipate such formaldehyde as may be carried by the cereal from the formaldehyde vapor bath.

I claim:

1. In a machine for treating cereals, a chamber, means for moving cereal to be treated through the chamber, a source of supply to the cereal-moving means, a vaporizer in communication with the chamber, means located between the source of cereal supply and the cereal-moving means to prevent the escape of vapor from the chamber, a hood in communication with the chamber arranged to receive the cereal from the moving means, air heating means, a jet in communication therewith and arranged to discharge into the hood, and means in said hood between said jet and the cereal-moving means to prevent escape of vapor from the chamber.

2. In a machine for treating cereals, a chamber, means for moving cereal to be treated through the chamber, a vaporizer in communication with the chamber, an inlet leading to the cereal-moving means and an outlet at the delivering end of the moving means, means located at both inlet and outlet to prevent the escape of vapor from the chamber, and means for subjecting the cereal, after having been discharged from the chamber, to a jet of heated air.

3. In a machine for treating cereals, a chamber, having an inlet and an outlet, for cereal to be treated, means for causing the cereal to be treated to move through the chamber between said inlet and outlet, a vaporizer arranged to discharge into said chamber beneath the body of cereal carried through the chamber, a controllable outlet for said vapor above the body of cereal, means located at both inlet and outlet to prevent the escape of the vapor from the chamber, and means for subjecting the cereal to a blast of hot air after having passed through the chamber.

In testimony whereof, I have signed my name to this specification, in presence of two subscribing witnesses.

EDWARD W. HOOKER.

Witnesses:
E. L. WALLACE,
EDWARD E. LONGAN.